United States Patent
Harada et al.

(10) Patent No.: US 8,590,658 B2
(45) Date of Patent: Nov. 26, 2013

(54) OCCUPANT PROTECTION DEVICE

(75) Inventors: Tatsuya Harada, Yokohama (JP);
Susumu Nakashima, Yokohama (JP);
Yukinori Midorikawa, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 13/701,667

(22) PCT Filed: Apr. 20, 2011

(86) PCT No.: PCT/JP2011/059695
§ 371 (c)(1),
(2), (4) Date: Dec. 3, 2012

(87) PCT Pub. No.: WO2011/152144
PCT Pub. Date: Dec. 8, 2011

(65) Prior Publication Data
US 2013/0162002 A1  Jun. 27, 2013

(30) Foreign Application Priority Data
Jun. 3, 2010  (JP) .................................. 2010-128170

(51) Int. Cl.
*B60R 21/00* (2006.01)
(52) U.S. Cl.
USPC .......................................... 180/268; 297/481
(58) Field of Classification Search
USPC ............. 180/268; 280/801.1, 801.2; 297/481, 297/483
See application file for complete search history.

(56) References Cited

U.S. PATENT DOCUMENTS

| | | | |
|---|---|---|---|
| 5,358,310 A * | 10/1994 | Nemoto | 297/483 |
| 7,407,193 B2 * | 8/2008 | Yamaguchi et al. | 280/805 |
| 8,087,697 B2 * | 1/2012 | Tanaka et al. | 280/807 |
| 2007/0046015 A1 * | 3/2007 | Tanaka et al. | 280/806 |
| 2007/0114775 A1 * | 5/2007 | Inuzuka et al. | 280/807 |
| 2013/0088001 A1 * | 4/2013 | Park et al. | 280/801.2 |

FOREIGN PATENT DOCUMENTS

| | | | |
|---|---|---|---|
| JP | 10278716 A | * | 10/1998 |
| JP | 2004-255994 | | 9/2004 |
| JP | 2007118776 A | * | 5/2007 |
| JP | 2009-040323 | | 2/2009 |
| JP | 2009040323 A | * | 2/2009 |
| JP | 2010-023609 | | 2/2010 |
| JP | 2010-120603 | | 6/2010 |

OTHER PUBLICATIONS

International Search Report of PCT/JP2011/059695 Mailed on Jun. 7, 2011 (1 Page).

* cited by examiner

*Primary Examiner* — Faye M. Fleming
(74) *Attorney, Agent, or Firm* — Brinks Gilson & Lione

(57) ABSTRACT

An occupant protection system includes a winding shaft that winds up a seat belt; a reacher rotatably supported by a rotating shaft and which changes the position of the seat belt in a front-back direction of a vehicle; a biasing member biasing the reacher to turn in a front direction of the vehicle; a retraction detection unit detects that the reacher is in a rear position; a motor rotates the winding shaft in a winding direction and a pull-out direction of the seat belt; a current detection unit detects the motor current; and a control unit The control unit is configured to change the rotating direction of the motor to the pull-out direction when the motor is rotating in the direction of winding up the seat belt, the reacher is not in the rear position, and the motor current is a predetermined current value or higher.

7 Claims, 16 Drawing Sheets

OCCUPANT PROTECTION DEVICE

BACKGROUND

1. Field of the Invention

The present invention relates to an occupant protection system including a seat belt for restraining and protecting the occupant.

2. Related Technology

A three-point occupant protection system provided in conjunction with a seat of a vehicle is a system for restraining and protecting an occupant upon the collision of the vehicle, and comprises a seat belt (webbing), a retractor, and a buckle. A retractor is disposed, for example, at the lower part of the center pillar, at the side of the seat, and winds one end side of the seat belt around a winding shaft and retracts the seat belt internally with the biasing force of a spiral spring, and, when the seat belt is not being worn, houses the seat belt in such retracted state. The other end side of the seat belt is folded back at a through-anchor disposed at the upper part of the center pillar, and is rotatably fixed by a plate-shaped belt position changing member provided at the lower part of the center pillar. Moreover, a tongue plate is inserted through the seat belt midway, and the tongue plate is configured to be secured to the buckle disposed on a side that is opposite to the refractor across the seat.

The occupant can wear the seat belt by pulling out the housed seat belt by pulling the tongue plate and securing the seat belt via the tongue plate to the buckle provided to the side of the seat.

Meanwhile, with the foregoing occupant protection system, in a state where the occupant is not wearing the seat belt immediately after getting into the car and sitting down, since the tongue plate is positioned at the rear of the seat, the occupant is required to twist one's body backward to pull out the seat belt.

Patent Document 1, Japanese Patent Application Publication No. 2009-40323, discloses an occupant protection system which enables the occupant, after sitting down, to easily wear the seat belt without having to twist one's body as a result of adopting a configuration of turning the belt position changing member frontward. Specifically, the belt position changing member is provided with a biasing member for turning the belt position changing member frontward, and the retractor comprises a motor for rotating the winding shaft in the normal/reverse direction, and a clutch. When the motor is driven via normal rotation, the clutch is operated and the drive force of the motor is transmitted to the winding shaft, whereby the seat belt is wound. When the motor is driven via reverse rotation, the clutch is released, and the drive force of the motor is not transmitted to the winding shaft. When the occupant gets into the car and wears the seat belt, the motor is driven via reverse rotation, and the belt position changing member is turned frontward based on the biasing force of the biasing member. Thus, the tongue plate moves toward the front of the seat, and the occupant can wear the seat belt without having to twist one's body backward. Moreover, when the occupant gets out of the car, the motor is driven via normal rotation to wind up the seat belt and turn the belt position changing member toward the rear of the vehicle, whereby the seat belt is retracted.

Nevertheless, with the occupant protection system described in Patent Document 1, since the turning of the belt position changing member is controlled by controlling the rotating speed of the motor, if the seat belt gets caught on the occupant's arm or the like while the belt position changing member is being moved to the rear position of the vehicle, there is a problem in that the occupant is strongly restrained by the seat belt and experiences a feeling of discomfort.

Moreover, while a configuration of detecting the motor current and stopping the rotation of the motor can also be considered, when the motor current is equal to or higher than the threshold current, there is a problem in that the normal rotation drive of the refractor is ended even though the retraction of the belt position changing member is not complete.

In addition, when the seat belt is to be removed, since the motor will not be driven via reverse rotation until the occupant gets off the car, the clutch remains in an ON state when the seat belt gets caught on the occupant's arm or the like and, therefore, there is a problem in that it becomes difficult to pull out the seat belt, and the occupant will experience a strong sense of discomfort.

SUMMARY

The present invention was devised in view of the foregoing problems, and an object of this invention is to provide an occupant protection system that lessens the possibility of a situation where, when the occupant attempts to remove the seat belt, the pull-out of the seat belt becomes difficult due to the seat belt getting caught on the occupant's arm or the like.

The occupant protection system according to the present invention includes: a winding shaft to which is connected one end of a seat belt restraining and protecting an occupant, and which winds up the seat belt therearound; a belt position changing member which is rotatably supported by a rotating shaft in which a shaft length direction is a horizontal direction, and to which is connected a part of the seat belt, and moreover which changes a position of the seat belt in a front-back direction of a vehicle; a biasing member which biases the belt position changing member to turn frontward; a position detection unit which detects that the belt position changing member is in a rear position; a motor which rotates the winding shaft in a direction of winding up and a direction of pulling out the seat belt; a current detection unit which detects a current flowing to the motor; and a control unit which controls the rotation of the motor based on detection results of the current detection unit and the position detection unit, wherein the control unit is configured to change the rotating direction of the motor to the pull-out direction when the motor is rotating in the winding direction of the seat belt, the belt position changing member is not in the rear position, and the current detected by the current detection unit is a predetermined current value or higher.

With the present invention, the motor is configured to change the rotating direction of the motor to the pull-out direction when the motor is rotating in the winding direction of the seat belt, the belt position changing member is not in the rear position, and the current detected by the current detection unit is a predetermined current value or higher. Accordingly, even when the seat belt gets caught on the occupant's arm or the like when the occupant removes the seat belt, it is possible to prevent a situation where the occupant is restrained by the seat belt and the removal of the seat belt becomes difficult.

With the occupant protection system according to the present invention, the control unit is configured to rotate the motor in the pull-out direction and, after the lapse of a predetermined time, rotate the motor in the winding direction.

With the present invention, when the motor is rotated in the pull-out direction, since the configuration is such that the motor is rotated in the winding direction after the lapse of a predetermined time, the winding of the seat belt and the retraction of the belt position changing member can be attempted a plurality of times.

With the occupant protection system according to the present invention, the control unit is configured to stop the rotation of the motor when the motor is rotating in the winding direction and the belt position changing member is in the rear position.

With the present invention, since the configuration is such that the rotation of the motor is stopped when the motor is rotating in the winding direction and the belt position changing member has turned to the rear position of the vehicle, the motor will not rotate unnecessarily.

The occupant protection system according to the present invention further includes: a door open/close detection unit which detects open/close of a door of the vehicle; a tongue plate attached to the seat belt; a buckle to which the tongue plate is secured; and a buckle switch which detects whether the tongue plate has been secured to the buckle, wherein the control unit is configured to rotate the motor in the winding direction when the door open/close detection unit detects an open state of the door and the buckle switch detects that the tongue plate has not been secured.

With the present invention, when the occupant gets off the car, the seat belt is wound and the belt position changing member is retracted rearward.

According to the present invention, it is possible to prevent a situation where, when the occupant attempts to remove the seat belt, the pull-out of the seat belt becomes difficult due to the seat belt getting caught on the occupant's arm or the like.

Further objects, features and advantages of this invention will become readily apparent to persons skilled in the art after a review of the following description, with reference to the drawings and claims that are appended to and form a part of this specification.

DETAILED DESCRIPTION

The present invention is now explained in detail with reference to the drawings that illustrate embodiments of this invention.

Figure 1:
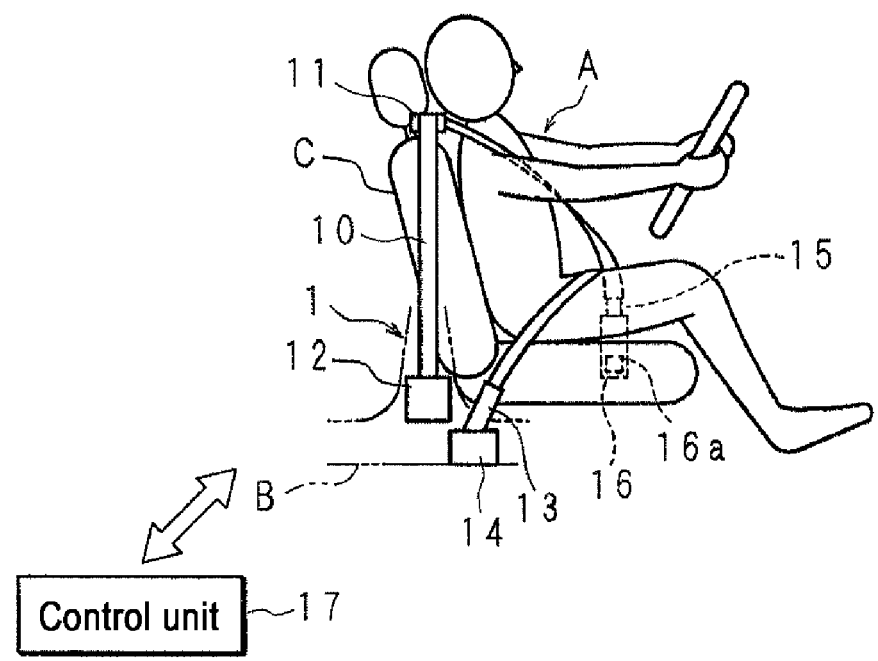
FIG. 1 is a schematic diagram showing the configuration of the occupant protection system according to an embodiment of the present invention.

FIG. 1 is a schematic diagram showing the configuration of the occupant protection system according to an embodiment of the present invention. The occupant protection system 1 of the present invention is a so-called three-point seatbelt system, and comprises a seat belt 10 for restraining an occupant A to a seat C, and a retractor 12 which is disposed at the lower part of a center pillar B, at the side of the seat C, and which can wind up and unwind the seat belt 10.

The seat belt 10 is folded back at a through-anchor 11 provided at the upper part of the center pillar B, and one end of the seat belt 10 is connected to the retractor 12. The other end of the seat belt 10 is connected to the apical end of a plate-shaped reacher (belt position changing member) 13 for changing the position of the seat belt 10 frontward or rearward. The reacher 13 is used for changing the position of the seat belt 10 to the front side or the rear side of the vehicle. A locking plate 14 for fixing the reacher 13 is disposed at the lower part of the center pillar B, and a base part 131 of the reacher 13 is rotatably supported, so that it can rotate around the locking plate 14, by a rotating shaft 13 lb in the horizontal direction described later. Moreover, a tongue plate 15 is movably inserted through the seat belt 10, and the tongue plate 15 is configured to be secured to a buckle 16 that is disposed on a side that is opposite to the retractor 12 across the seat C. The buckle 16 is provided with a buckle switch 16a for detecting whether the tongue plate 15 has been secured to the buckle 16, and outputting a signal indicating the detection result to the control unit 17 described later.

Figure 2:
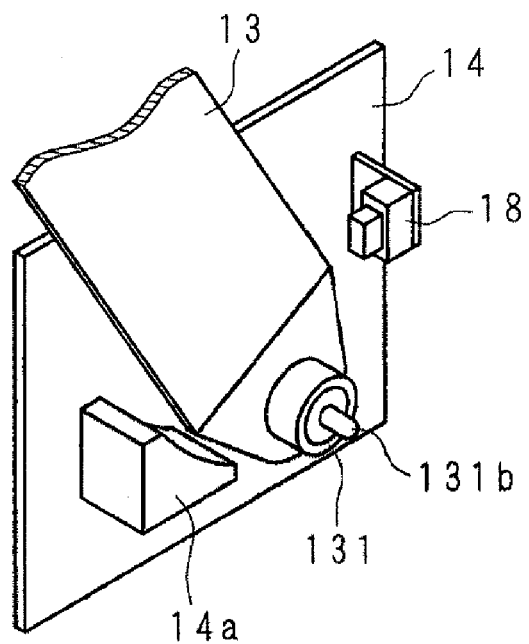
FIG. 2 is a perspective view schematically showing a configuration example of the reacher provided to the locking plate.
Figure 3:
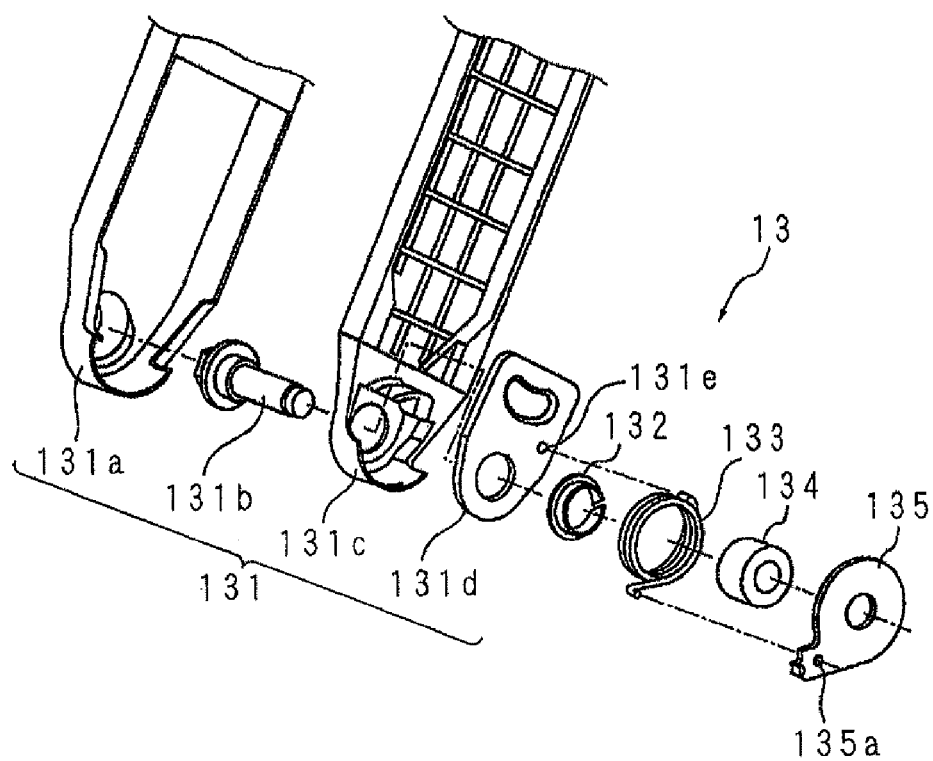
FIG. 3 is an exploded perspective view schematically showing a configuration example of the reacher.

FIG. 2 is a perspective view schematically showing a configuration example of the reacher 13 provided to the locking plate 14, and FIG. 3 is an exploded perspective view schematically showing a configuration example of the reacher 13. The base part 131 of the reacher 13 comprises a boot 131a, a horizontal direction rotating shaft 131b, a supporting element 131c, and an anchor plate 131d which are disposed in order from the side of the seat belt 10 toward the lateral face side of the vehicle. The base part 131 is additionally provided with a plastic washer 132, a return spring (biasing member) 133 for biasing the reacher 13 to turn toward the front of the vehicle, a washer 134 and a hold plate 135.

Based on the foregoing configuration, the base part 131 of the reacher 13 is axially supported rotatably around the locking plate 14 at the lower part of the vehicle interior. Note that the illustrated rotating shaft 131b is merely an example, and other configurations may also be adopted so as long as the seat belt 10 can be moved forward and backward based on the rotation of the reacher 13. Moreover, while the rotating shaft 131b is supported by the locking plate 14, the rotating shaft 131b may also be supported by a different member so as long as it can be rotated forward and backward relative to the vehicle body. In addition, the return spring 133 is merely an example of a biasing member, and the biasing member is not limited thereto. The biasing member simply needs to be a member that is capable of applying biasing force to the reacher 13 for at least turning the reacher 13 in the advancing direction of the vehicle and, for example, may also be a coil spring, torsion bar or the like.

The return spring 133 is mounted on the base part 131 of the reacher 13 and on the vehicle body. Specifically, as shown in FIG. 3, one end of the return spring 133 is hooked to a hole 131e of the anchor plate 131d, and the other end of the return spring 133 is hooked to a hole 135a of the hold plate 135 fixed by the locking plate 14.

Figure 4:
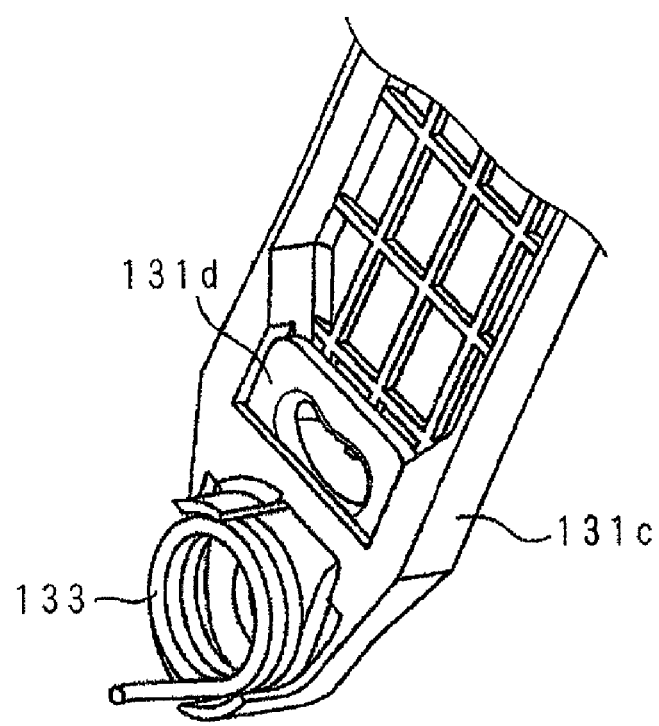
FIG. 4 is a perspective view showing the assembled state of the reacher in FIG. 3.
Figure 5:
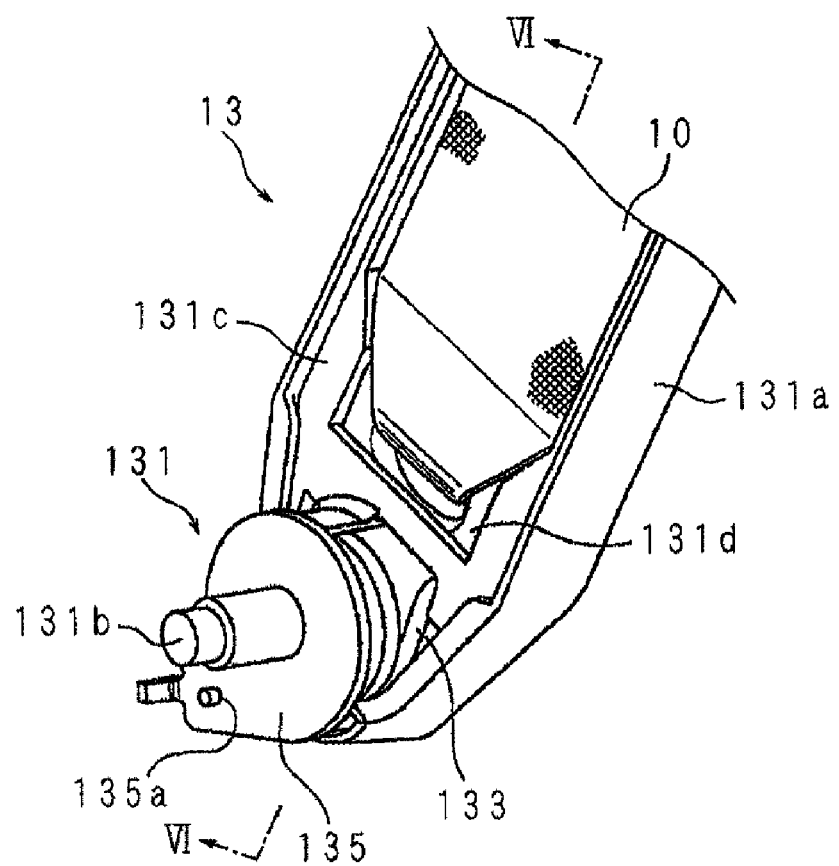
FIG. 5 is a perspective view showing the assembled state of the reacher in FIG. 3.
Figure 6:
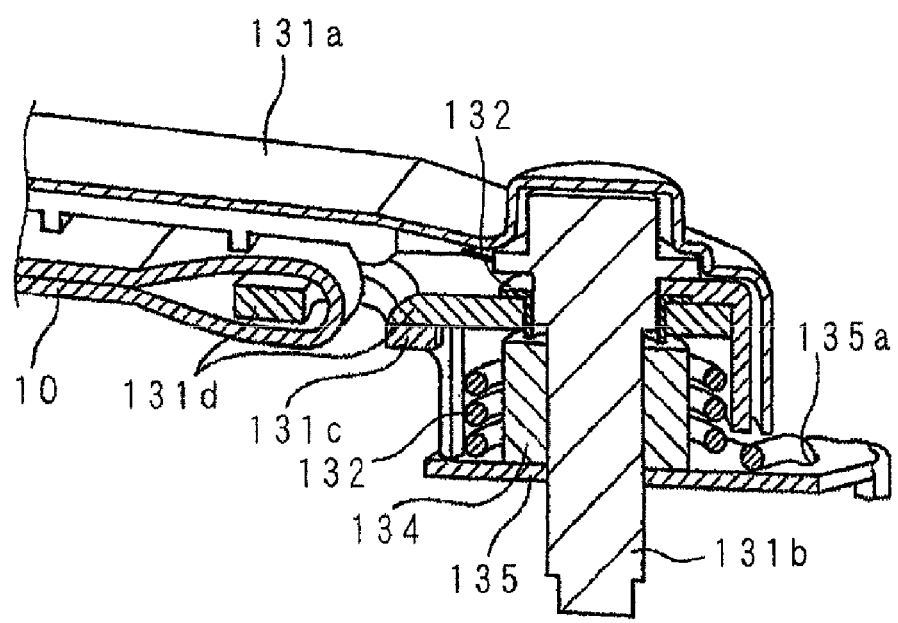
FIG. 6 is a cross section generally taken along line VI-VI of FIG. 5.

FIG. 4 and FIG. 5 are perspective views showing the assembled state of the reacher 13 shown in FIG. 3, and FIG. 6 is a cross section of line VI-VI of FIG. 5. Upon assembling the reacher 13, as shown in FIG. 4, the anchor plate 131d is foremost inserted into a picket-shaped space of the supporting element 131c, and the return spring 133 is thereby mounted. Subsequently, as shown in FIG. 5, the boot 131a and the rotating shaft 131b are mounted from behind, and the washer 134 and the hold plate 135 are mounted from the front. In addition, the seat belt 10 is connected to the apical end of the reacher 13. In other words, the other end of the seat belt is pulled in up to the base part 131 of the reacher 13 through the supporting element 131c from the apical end of the reacher 13, and fixed to the anchor plate 131d. Since the reacher 13 is biased by the return spring 133 to turn frontward of the vehicle, the reacher 13 changes the position of the seat belt 10 frontward and backward by rotating around the base part 131.

The locking plate 14 is provided, as shown in FIG. 2, with a stopper 14a for restricting the rotation of the reacher 13 in the front-back direction. In other words, while the reacher 13 is biased to rotate frontward of the vehicle by the biasing force of the return spring 133 when the seat belt 10 is being pulled, the stopper 14a retains the reacher 13, which is rotating frontward, at a predetermined forward tilt posture, and restricts the reacher 13 from rotating frontward any further.

Moreover, the locking plate 14 is provided with a retraction detection unit (position detection unit) 18 for detecting that the reacher 13 is at a predetermined rear position. The retraction detection unit 18 is, for example, a limit switch, and when the reacher 13 is rotated backward of the vehicle, the side part of the reacher 13 comes into contact with the limit switch, and the limit switch is thus pressed and becomes an ON state. When the reacher 13 is rotated frontward, the reacher 13 becomes separated from the limit switch, and the limit switch becomes an OFF state. Note that the limit switch is merely an example of the retraction detection unit 18, and any sensor may be used so as long as it is able to at least detect that the reacher 13 is at a predetermined rear position. For example, as the retraction detection unit 18, a photo coupler, rotation detection sensor and the like may also be adopted. Moreover, the retraction detection unit 18 is preferably disposed within the trim of the center pillar B so that it will not be easily touched by the occupant A.

Figure 7:
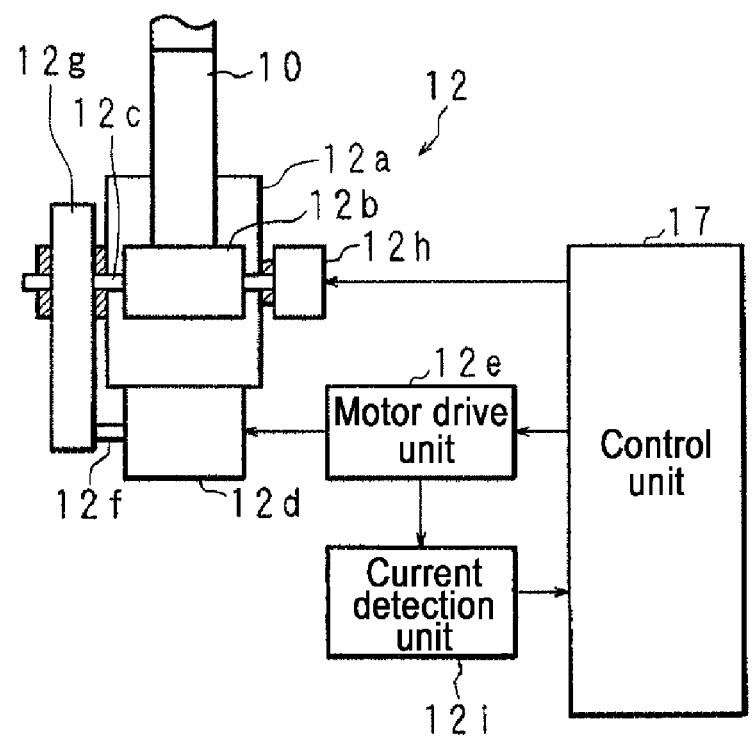
FIG. 7 is a cross section conceptually showing an example of the retractor.

FIG. 7 is a cross section conceptually showing an example of the retractor 12. The retractor 12 comprises a metal housing 12a which forms a substantial U-shape in a planar view, and a winding shaft 12b provided rotatably within the housing 12a. One end of the seat belt 10 is connected to the winding shaft 12b, and the winding shaft 12b is biased in the rotating direction in which the seat belt 10 is wound around the winding shaft 12b based on a winding spring not shown. Accordingly, the seat belt 10 can be pulled out by the occupant A, and, when the seat belt 10 that was pulled out by the occupant A is released, the seat belt 10 is wound up to a predetermined position with the biasing force of the winding spring, and housed in the housing 12a.

Moreover, the retractor 12 comprises a motor 12d which rotates the winding shaft 12b in the winding direction and the pull-out direction of the seat belt 10, and a current detection unit 12i which detects the current flowing to the motor 12d and outputs a signal indicating the detected current value to the control unit 17 described later. The motor 12d is driven by the current supplied from the motor drive unit 12e. The rotation of the motor 12d by the motor drive unit 12e is controlled by the control unit 17. More specifically, the motor drive unit 12e includes a PWM (Pulse Width Modulation) control circuit, and the control unit 17 turns ON/OFF the switching element configuring the motor drive unit 12e and drives the motor 12d by outputting the PWM control signal to the motor drive unit 12e. The drive voltage of the motor 12d is, for example, 12 V. The winding shaft 12b includes a shaft part 12c which protrudes from the center part toward the outside in the central direction, and the shaft part 12c is connected to a drive shaft 12f of the motor 12d via a force transmission mechanism 12g. The winding shaft 12b rotates in the belt winding direction based on the drive force that is transmitted via the force transmission mechanism 12g.

The force transmission mechanism 12g is configured from a gear which transmits the rotation of the output shaft of the motor 12d to the winding shaft 12b, and a clutch for restricting the rotating direction of the gear. When the motor 12d is rotated via positive rotation, the clutch is operated and the drive force of the motor 12d is transmitted to the winding shaft 12b, and the winding shaft 12b rotates in the belt winding direction. When the motor 12d is rotated via negative rotation, the clutch is released and the drive force of the motor 12d is not transmitted to the winding shaft 12b.

In addition, the retractor 12 is provided with a gas-forming agent pretensioner 12h. The gas-forming agent pretensioner 12h includes a gas-forming agent, a firelighter for igniting the gas-forming agent, and a mechanism for transmitting the pressure of gas generated from the gas-forming agent to the winding shaft 12b as the torque of the winding shaft 12b. When the collision of the vehicle is detected, current flows to the firelighter according to the control of the control unit 17, gas is generated from the gas-forming agent, and the winding shaft 12b is rotated in the belt winding direction based on the pressure of the generated gas.

Moreover, the retractor 12 comprises a pull-out locking mechanism. The pull-out locking mechanism is a mechanism for locking the pull-out of the seat belt 10, for example, when the pull-out acceleration of the seat belt 10 becomes not less than a predetermined acceleration.

Furthermore, the retractor 12 comprises a load limiter mechanism. The load limiter mechanism is configured such that, when the load applied to the seat belt 10 becomes a predetermined load or higher, the belt is pulled out even when the pull-out of the seat belt 10 is locked, so that the load does not increase to a predetermined load or higher. The load limiter mechanism is configured, for example, from the torsion bar portion provided midway of the winding shaft 12b, and is configured to yield and rotate when rotational stress of a predetermined load or higher is applied.

Figure 8:
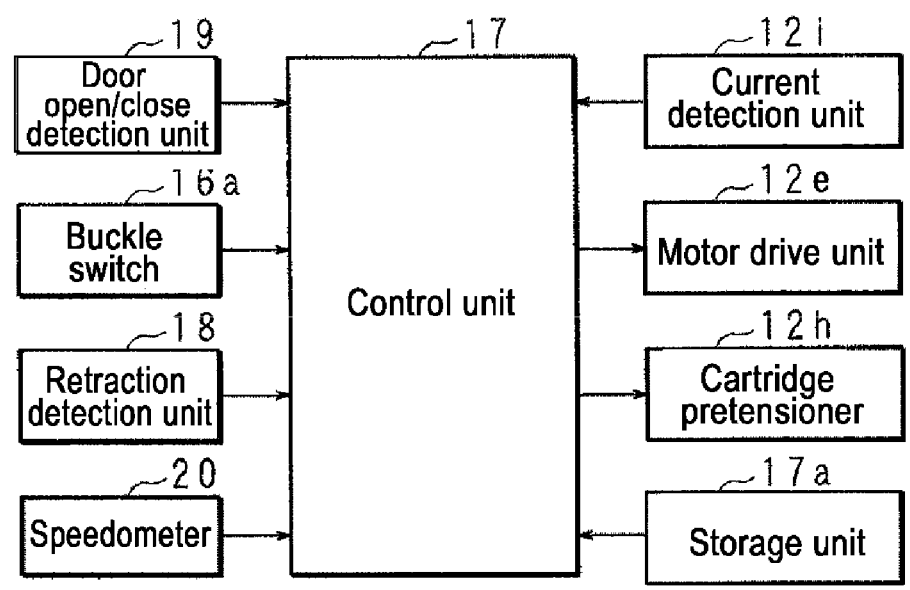
FIG. 8 is a block diagram schematically showing an example of the circuits configuring the occupant protection system.

FIG. 8 is a block diagram schematically showing a configuration example of the circuits configuring the occupant protection system 1. The occupant protection system 1 comprises a control unit 17 which controls the operation of the respective components of the occupant protection system 1. The control unit 17 is, for example, a microcomputer comprising a CPU, and connected to the CPU, via a bus not shown, are a door open/close detection unit 19, the buckle switch 16a, the retraction detection unit 18, a speedometer 20, the current detection unit 12i, the motor drive unit 12e, the gas-forming agent pretensioner 12h, and a storage unit 17a. The door open/close detection unit 19 is a switch for detecting the open/close of the door of a vehicle, which is not shown, and outputs a signal indicating the opened/closed state of the door to the control unit 17. The speedometer 20 detects the speed of the vehicle, and outputs a signal indicating the detected speed to the control unit 17. Moreover, the storage unit 17a stores computer programs and various types of information required for the operation of the control unit 17, and the control unit 17 controls the operation of the occupant protection system 1 by reading and executing the computer programs and various types of information from the storage unit 17a.

Figure 9:
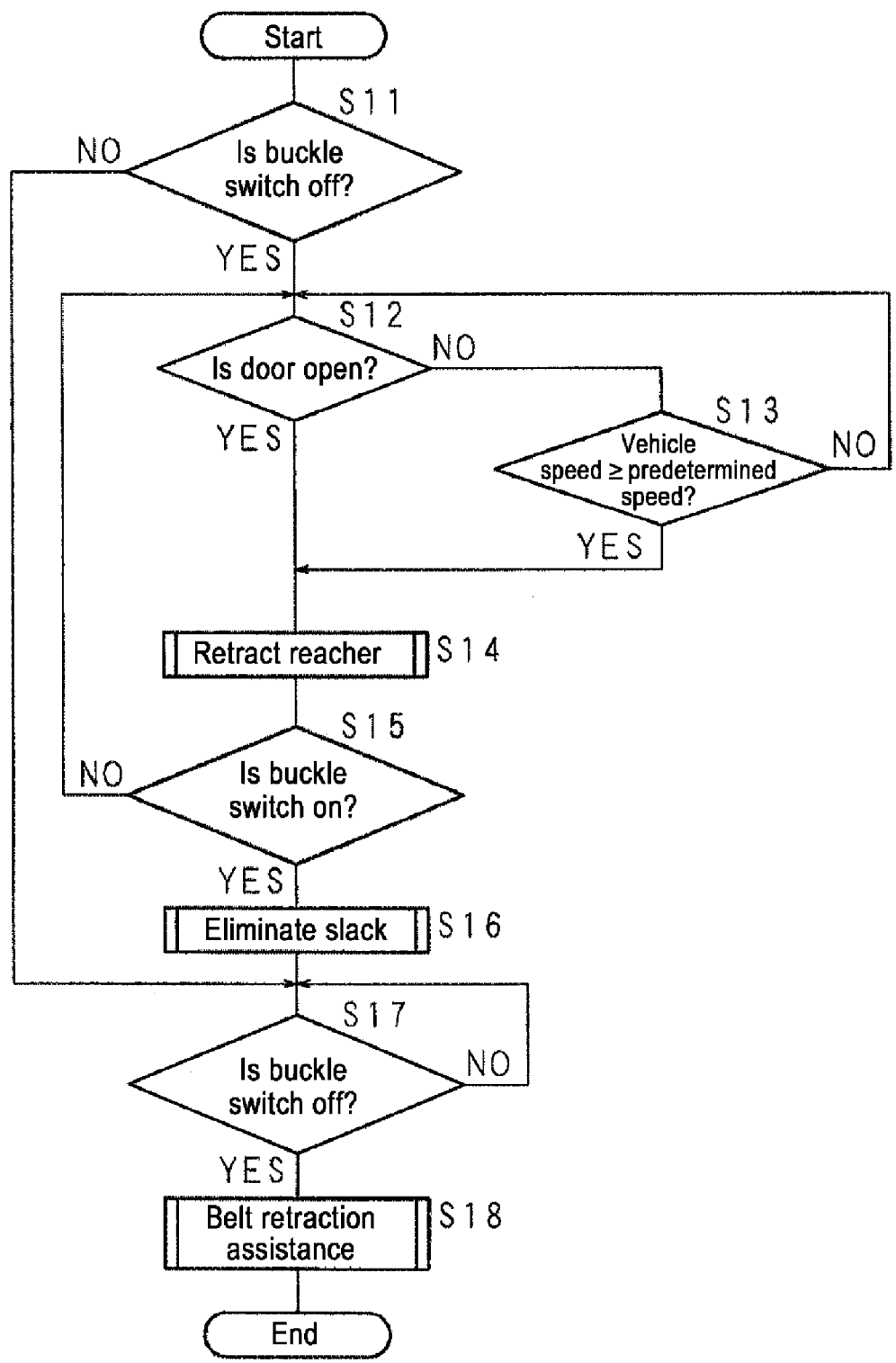
FIG. 9 is a flowchart showing the processing routine of the control unit.

FIG. 9 is a flowchart showing the processing routine of the control unit 17. The control unit 17 monitors the output signal from the buckle switch 16a, and determines whether the buckle switch 16a is in an OFF state (step S11). When it is determined that the buckle switch 16a is in an OFF state (step S11: YES), the control unit 17 monitors the output signal from the door open/close detection unit 19, and determines whether the door of the vehicle is in an open state (step S12). When it is determined that the door is not in an open state (step S12: NO), the control unit 17 receives the output signal from the speedometer 20 and determines whether the speed of the vehicle indicated by the received signals is a predetermined speed or faster (step S13). When it is determined that the door is in an open state in the processing of step S12 (step S12: YES), or when it is determined that the speed of the vehicle is a predetermined speed or faster (step S13: YES), the control unit 17 calls the subroutine and performs the processing pertaining to the retraction of the reacher 13 (step S14).

When the buckle switch 16a is in an OFF state and the door is open, since it is assumed that the occupant A will be getting out of the car, the reacher 13 is rotated backward of the vehicle so that the reacher 13 and the seat belt 10 do not get in the way of the occupant A getting out of the car.

Moreover, when the door is closed and the buckle switch 16a is in an OFF state and the vehicle speed is a predetermined speed or faster, since it is assumed that the occupant A is not seated, the reacher 13 is retracted. If the reacher 13 is positioned frontward while the vehicle is moving, there is a possibility that the tongue plate 15 may come into contact with the vehicle body due to the vibration of the moving vehicle and generate abnormal noise. However, this problem can be avoided by retracting the reacher 13. Moreover, when no one is sitting in the seat C, it is also possible to retract the reacher 13 to achieve a cleaner appearance.

Figure 10:
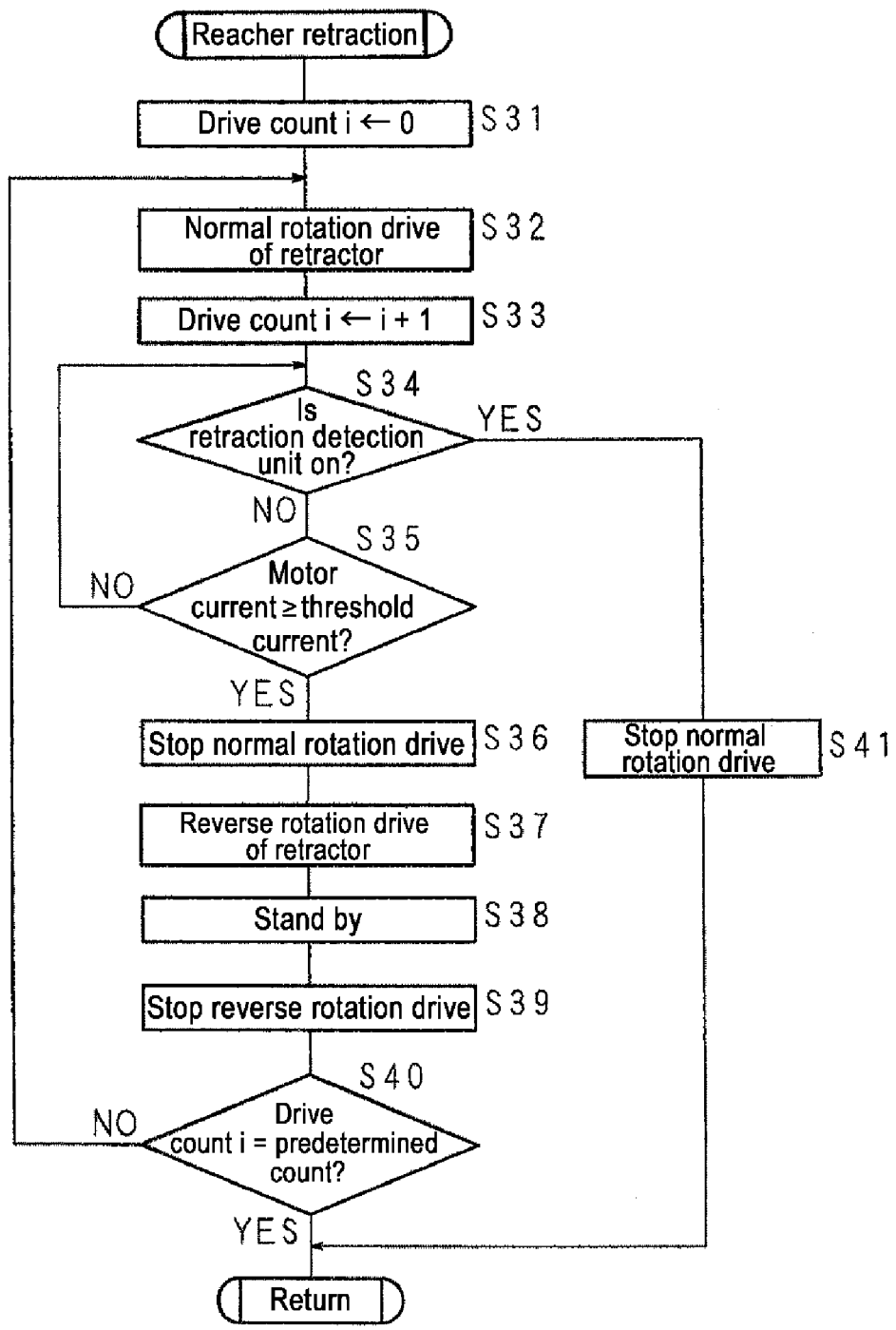
FIG. 10 is a flowchart showing the processing routine of the control unit pertaining to the retraction of the reacher.

FIG. 10 is a flowchart showing the processing routine of the control unit 17 pertaining the retraction of the reacher 13. When the subroutine pertaining to the retraction of the reacher 13 is called, the control unit 17 sets 0 as the drive count i (step S31). Note that i shows the variable which indicates the drive count. Subsequently, the control unit 17 drives the retractor 12 via normal rotation (step S32). In other words, the control unit 17 drives the motor 12d via normal rotation by supplying a control signal to the motor drive unit 12e. More specifically, by outputting a PWM control signal to the motor drive unit 12e, the switching element configuring the motor drive unit 12e is turned ON/OFF, and the motor 12d is thereby driven. The torque of the motor 12d in the retraction processing of the reacher 13 is set so that the reacher 13 can be rotated backward against the biasing force of the return spring 133 which is biasing the reacher 13.

Subsequently, the control unit 17 increments the drive count i by 1 (step S33). The control unit 17 thereafter monitors the signals output from the retraction detection unit 18, and determines whether the retraction detection unit 18 is in an ON state (step S34).

Figure 11:
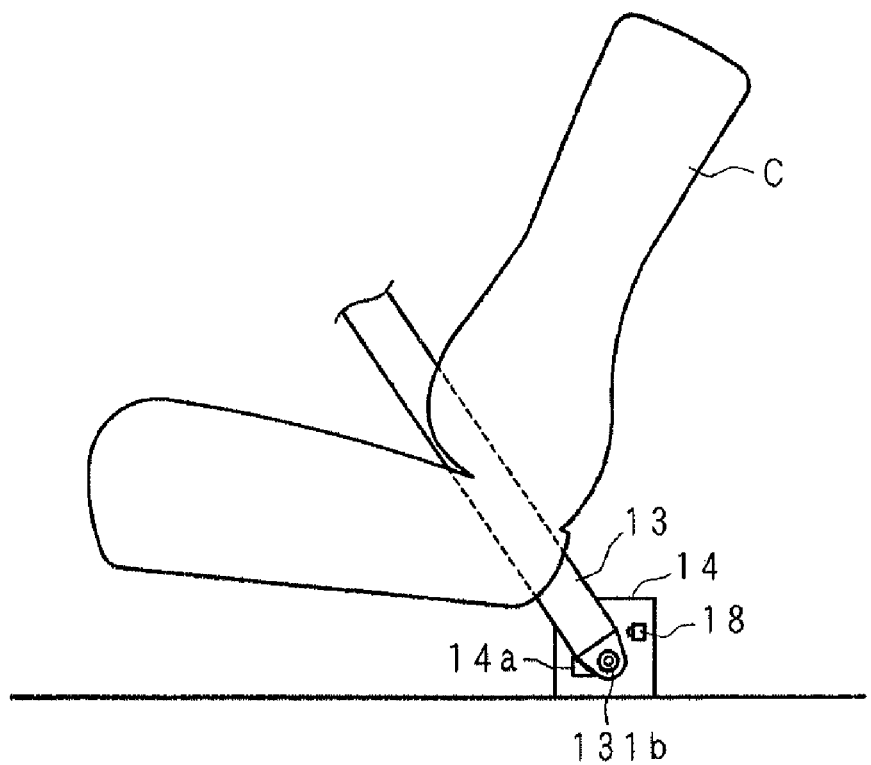
FIG. 11 is a side view of the occupant protection system, in which the reacher is positioned toward the front of the vehicle, seen from the buckle side.
Figure 12:
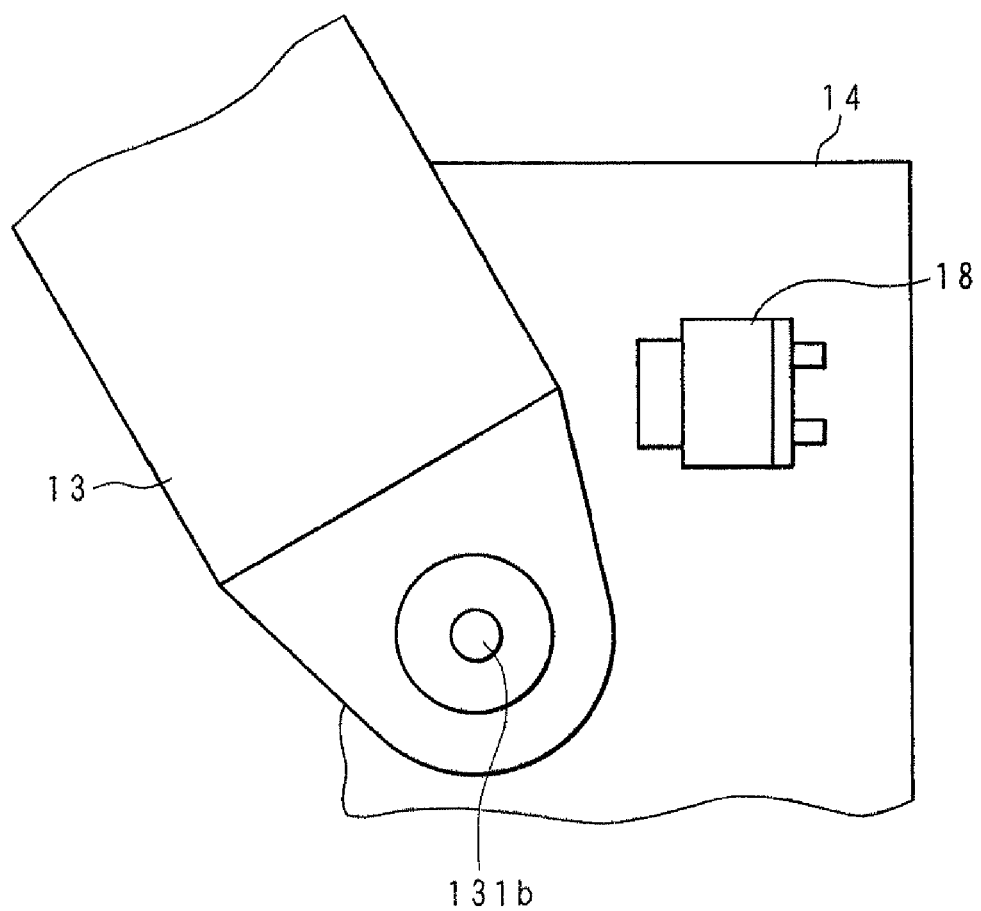
FIG. 12 is a side view schematically showing the retraction detection unit in an OFF state.
Figure 13:
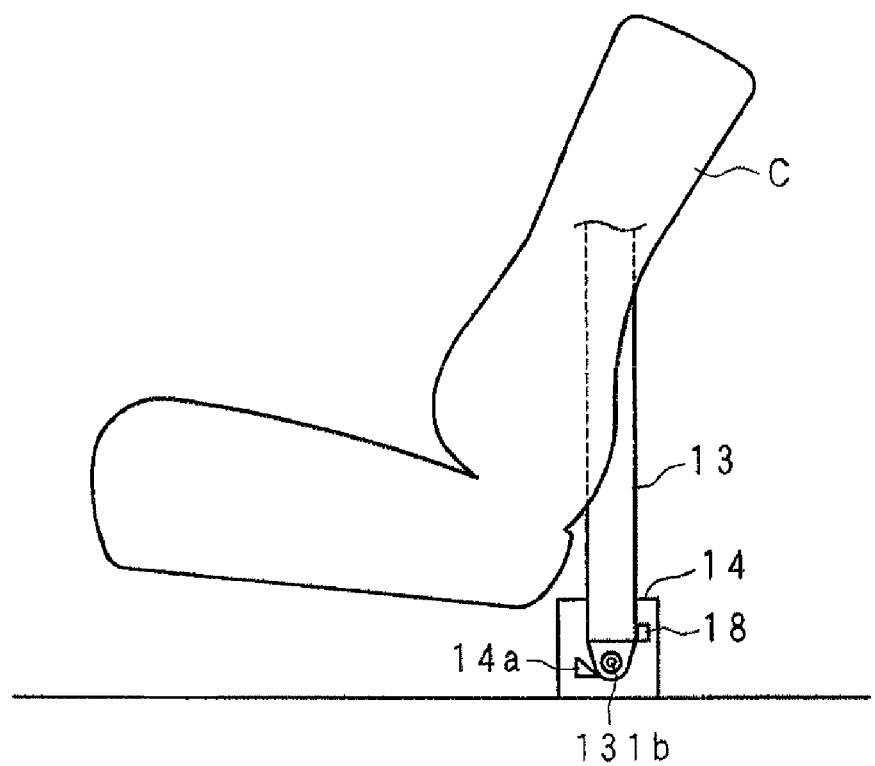
FIG. 13 is a side view of the occupant protection system, in which the reacher is positioned toward the rear of the vehicle, seen from the buckle side.
Figure 14:
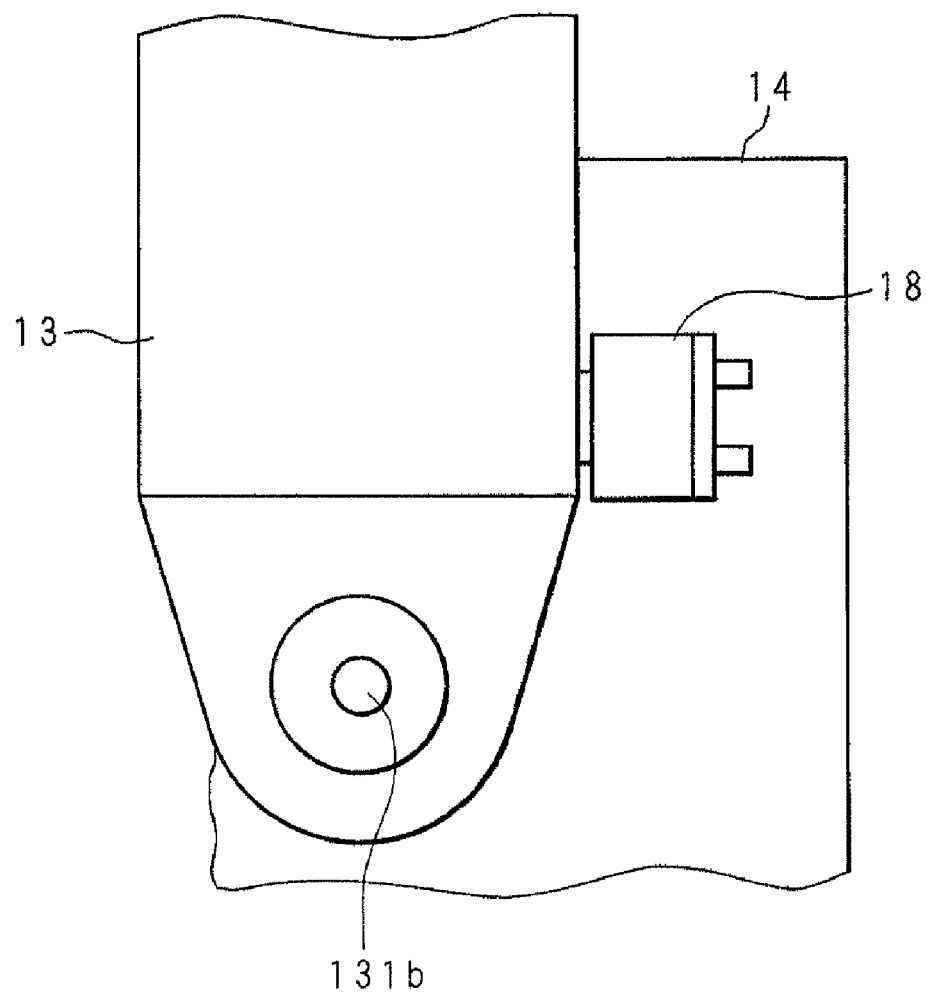
FIG. 14 is a side view schematically showing the retraction detection unit in an ON state.

FIG. 11 is a side view of the occupant protection system 1, in which the reacher 13 is positioned at the front of the vehicle, seen from the buckle 16 side, FIG. 12 is a side view schematically showing the retraction detection unit 18 in an OFF state, FIG. 13 is a side view of the occupant protection system 1, in which the reacher 13 is positioned at the rear of the vehicle, seen from the buckle 16 side, and FIG. 14 is a side view schematically showing the retraction detection unit 18 in an ON state. As shown in FIG. 13 and FIG. 14, when it is determined that the reacher 13 is positioned at the rear of the vehicle and the retraction detection unit 18 is in an ON state (step S34: YES), the control unit 17 stops the normal rotation drive of the motor 12d (step S41), and ends the processing.

As shown in FIG. 11 and FIG. 12, when it is determined that the reacher 13 is positioned toward the front of the vehicle and the retraction detection unit 18 is in an OFF state (step S34: NO), the control unit 17 receives the signals output from the current detection unit 12i, and determines whether the motor current indicated by the received signals is a predetermined threshold current or more (step S35 in FIG. 10). When it is determined that the motor current is less than the threshold current (step S35: NO), the control unit 17 returns the processing to step S34. When it is determined that the motor current is equal to or greater than the threshold current (step S35: YES), the control unit 17 stops the normal rotation drive of the retractor 12 (step S36), and subsequently drives the retractor 12 via reverse rotation (step S37). The time that the retractor 12 is subject to the normal rotation drive; that is, the time that the motor 12d is subject to the normal rotation drive based on the processing of step S32 and step S36 is approximately 0.1 to several seconds. For example, a single normal rotation drive may be set to be 1 to 3 seconds. Subsequently, the control unit 17 stands by for a predetermined time (step S38), and then stops the reverse rotation drive of the retractor 12 (step S39). Note that the predetermined time is several seconds.

When the retraction detection unit 18 is in an OFF state and the motor current is equal to or greater than the threshold, since it is assumed that the seat belt 10 is caught on the occupant A's arm or the like, the normal rotation drive of the retractor 12 is stopped, and the retractor 12 is alternatively drive in reverse rotation. By not only stopping the retractor 12 but additionally driving the retractor 12 in reverse rotation, it is possible to cause the clutch to be in an OFF state, thereby enabling the seat belt 10 that got caught on an arm or the like to be easily pulled out.

Subsequently, the control unit 17 determines whether the drive count i is a predetermined count (step S40). The predetermined count is, for example, 3 times. When it is determined that the drive count i is not a predetermined count (step S40: NO), the control unit 17 returns the processing to step S32. When it is determined that the drive count i is a predetermined count (step S40: YES), the control unit 17 ends the processing pertaining to the retraction of the reacher 13.

Based on the foregoing processing, the normal rotation drive and reverse rotation drive of the retractor 12 can be executed a plurality of times, and it is possible to prevent the normal rotation drive of the retractor 13 from ending in a state where the retraction of the reacher 13 is not complete.

Returning to FIG. 9, when it is determined that the speed of the vehicle is less than a predetermined speed (step S13: NO), the control unit 17 returns the processing to step S12, once again monitors the signals output from the door open/close detection unit 19, and determines whether the door of the vehicle is in an open state.

Meanwhile, the control unit 17 that completed the retraction processing of the reacher 13 monitors the signals output from the buckle switch 16a and determines whether the buckle switch 16a is in an ON state (step S15). When it is determined that the buckle switch 16a is not in an ON state (step S15: NO), the control unit 17 returns the processing to step S12. When it is determined that the buckle switch 16a is in an ON state (step S15: YES); that is, when the tongue plate 15 is removed from the buckle 16, the control unit 17 calls the subroutine and performs the processing pertaining to slack elimination (step S16). When the buckle switch 16a becomes an ON state in a state where the door is closed, since it is assumed that the occupant A finished wearing the seat belt 10, the slack of the seat belt 10 is eliminated by winding up the seat belt 10.

Figure 15:
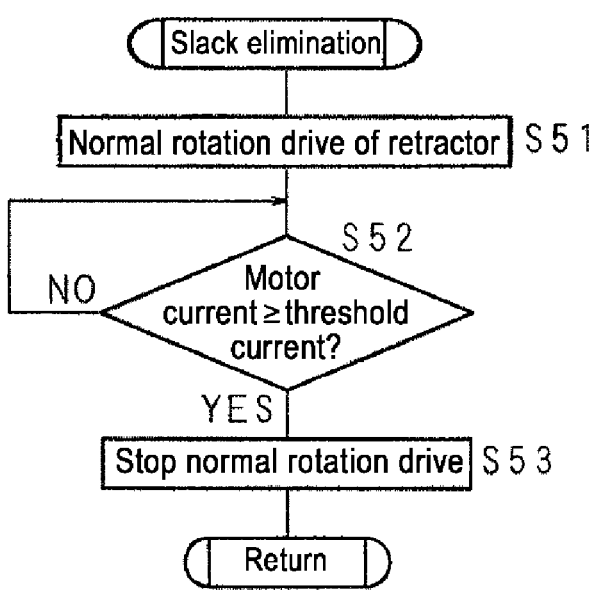
FIG. 15 is a flowchart showing the processing routine of the control unit pertaining to the slack elimination of the seat belt.

FIG. 15 is a flowchart showing the processing routine of the control unit 17 pertaining to the slack elimination of the seat belt 10. When the subroutine pertaining to slack elimination is called, the control unit 17 drives the retractor 12 via normal rotation (step S51). Subsequently, the control unit 17 receives the output signals from the current detection unit 12i, and determines whether the motor current indicated by the received signals is a predetermined threshold current or more (step S52). When it is determined that the motor current is less than the threshold current (step S52: NO), the control unit 17 returns the processing to step S52. When it is determined that the motor current is equal to or greater than the threshold current (step S52: YES), the control unit 17 stops the normal rotation drive of the retractor 12 (step S53), and ends the processing pertaining to slack elimination.

Note that the threshold current used in step S52 is preferably smaller than the threshold current used in step S35. In the processing of step S52, it will suffice so as long as the slack of the seat belt 10 can be eliminated.

Returning to FIG. 9, when it is determined that the buckle switch 16a is in an ON state (step S11: NO) or the processing pertaining to slack elimination is ended, the control unit 17 monitors the signals output from the buckle switch 16a, and determines whether the buckle switch 16a is in an OFF state (step S17). When it is determined that the buckle switch 16a is not in an OFF state in the processing of step S11 and step S17 (step S17: NO), the control unit 17 returns the processing to step S17. When it is determined that the buckle switch 16a is in an OFF state (step S17: YES); that is, when the tongue plate 15 is secured to the buckle 16, the control unit 17 calls the subroutine, performs the processing pertaining to the retraction assistance of the seat belt 10 (step S18), and ends the processing. When the buckle switch 16a changes from an ON state to an OFF state, since it is assumed that the occupant A has removed the seat belt 10 and will get off the car, the retraction of the seat belt 10 is assisted by winding up the seat belt 10.

Figure 16:
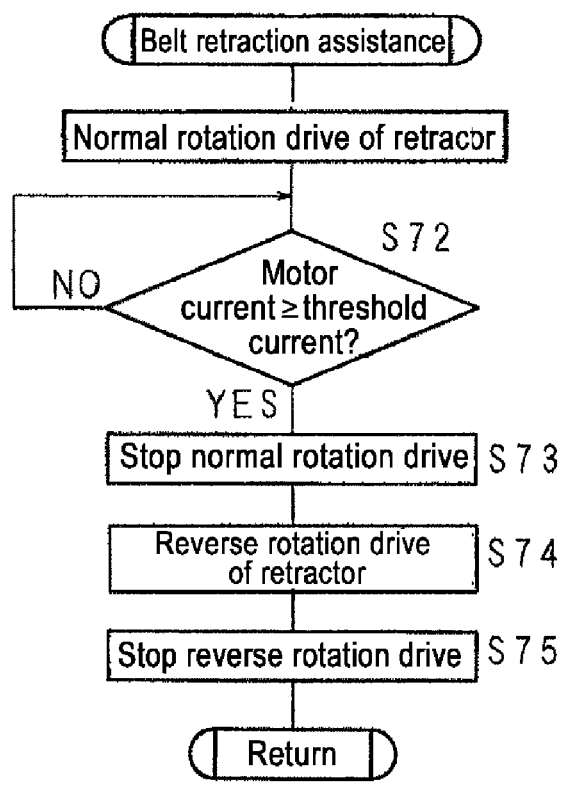
FIG. 16 is a flowchart showing the processing routine of the control unit pertaining to the belt retraction assistance.

FIG. 16 is a flowchart showing the processing routine of the control unit 17 pertaining the belt retraction assistance. When the subroutine pertaining to the retraction assistance of the seat belt 10 is called, the control unit 17 drives the retractor 12 via normal rotation (step S71). The torque of the motor 12d in the processing pertaining to the belt retraction assistance is smaller than the torque of the motor 12d in step S32, and will suffice so as long as it can at least eliminate the slack of the seat belt 10 and house the seat belt 10 in the retractor 12. In other words, torque capable of rotating the reacher 13 backward against the biasing force of the return spring 133 that is biasing the reacher 13 is not required.

Subsequently, the control unit 17 receives the signals output from the current detection unit 12i, and determines whether the motor current indicated by the received signals is a predetermined threshold current or more (step S72). When it is determined that the motor current is less than the threshold current (step S72: NO), the control unit 17 returns the processing to step S72. When it is determined that the motor current is equal to or greater than the threshold current (step S72: YES), the control unit 17 stops the normal rotation drive of the retractor 12 (step S73). Subsequently, the control unit 17 drives the retractor 12 via reverse rotation (step S74), stands by for a predetermined time, thereafter stops the reverse rotation drive (step S75), and then ends the processing pertaining to the retraction assistance of the seat belt 10.

With the occupant protection system 1 according to the foregoing embodiment and configured as described above, since the normal rotation drive of the retractor 12 is stopped and driven via reverse rotation when the retraction detection unit 18 is in an ON state and the threshold of the motor current is a predetermined threshold or more upon driving the motor 12d via normal rotation and retracting the reacher 13, it is possible to prevent a situation where the pull-out of the seat belt 10 becomes difficult when the occupant A attempts to remove the seat belt 10 due to the seat belt 10 getting caught on the arm or the like. Specifically, then the arm or the like get caught on the seat belt while the reacher 13 is being retracted, the seat belt 10 is pulled back an appropriate length, and, since the clutch can be caused to be in an OFF state, the occupant A can easily pull out the seat belt 10 and remove the seat belt 10 that got caught on the arm or the like.

Moreover, when the retractor 12 is driven via reverse rotation, since the retractor 12 is cause to be driven via normal rotation drive once again, it is possible to prevent the normal rotation drive of the retractor 12 from ending in a state where the retraction of the reacher 13 is not complete. In other words, even in cases where the occupant A's arm or the like gets caught on the seat belt 10 and the normal rotation drive of the retractor 12 is stopped during the retraction processing of the retractor 12, it is possible to drive the retractor 12 via normal rotation once again and perform the retraction of the retractor 12.

In addition, since the normal rotation drive of the retractor 12 is immediately stopped when the reacher 13 is normally retracted, it is possible to eliminate a situation where the motor 12d is rotated unnecessarily.

Furthermore, since the rotation of the motor 12d for the retraction of the reacher 13 is controlled by directly detecting the position of the reacher 13, in comparison to the case of determining the retraction state of the seat belt 10 and the reacher 13 based on a rotation sensor provided inside the retractor 12 and driving the motor 12d, it is possible to configure the occupant protection system 1 more simply and with low cost.

The embodiments disclosed above are all exemplifications in all respects, and it should be considered that such embodiments are not limitary. The scope of the present invention is not implied by the foregoing embodiments, and is specified in the scope of claims, and all modifications within the equivalent meaning and scope as the scope of claims are covered by the present invention.

Listing of Reference Numerals
1 occupant protection system
10 seat belt
11 through-anchor
12 retractor
12b winding shaft
12d motor
12e motor drive unit
12i current detection unit
13 reacher
14 locking plate
14a stopper 15 tongue plate
16 buckle
16a buckle switch
17 control unit
17a storage unit
18 retraction detection unit
19 door open/close detection unit
20 speedometer
131a boot
131b rotating shaft
131c supporting element
131d anchor plate
132 plastic washer
133 return spring
134 washer
135 hold plate
A occupant
B center pillar
C seat

The invention claimed is:

1. An occupant protection system for a vehicle, comprising:
a winding shaft connected to one end of a seat belt, the winding shaft being configured to wind the seat belt therearound;
a belt position changing member which is rotatably supported by a rotatable shaft and to which the seat belt is connected, the belt position changing member changing a position of the seat belt in a front-back direction of the vehicle;
a biasing member coupled to and biasing the belt position changing member to turn frontward of the vehicle toward a front position;
a position detection unit configured to detect when the belt position changing member is in a rear position;
a motor coupled to the winding shaft and configured to rotate the winding shaft in a winding up direction and a pulling out direction of the seat belt;
a current detection unit that detects a current flowing to the motor; and
a control unit configured to control the rotation of the motor based on detection results of the current detection unit and the position detection unit, and
wherein the control unit is configured to change the rotating direction of the motor to the pulling out direction when the motor is rotating in the winding direction of the seat belt, the belt position changing member is not in the rear position, and the current detected by the current detection unit is at least a predetermined current value.

2. The occupant protection system according to claim 1, wherein the control unit is configured to rotate the motor in the pulling out direction and, after a predetermined time, to rotate the motor in the winding direction.

3. The occupant protection system according to claim 2, wherein the control unit is configured to stop rotation of the motor when the motor is rotating in the winding direction and the belt position changing member is in the rear position.

4. The occupant protection system according to claim 3, further comprising:
a door open/close detection unit which detects an open state and a closed state of a door of the vehicle;
a tongue plate attached to the seat belt;
a buckle to which the tongue plate is secured; and
a buckle switch that detects whether the tongue plate is not secured to the buckle,
wherein the control unit is configured to rotate the motor in the winding direction when the door open/close detection unit detects an open state of the door and the buckle switch detects that the tongue plate is not secured to the buckle.

5. The occupant protection system according to claim 2, further comprising:
a door open/close detection unit that detects an open state and a closed state of a door of the vehicle;
a tongue plate attached to the seat belt;
a buckle to which the tongue plate is secured; and
a buckle switch that detects whether the tongue plate is not secured to the buckle,
wherein the control unit is configured to rotate the motor in the winding direction when the door open/close detection unit detects an open state of the door and the buckle switch detects that the tongue plate is not secured to the buckle.

6. The occupant protection system according to claim 1, further comprising:
a door open/close detection unit that detects an open state and a closed state of a door of the vehicle;
a tongue plate attached to the seat belt;
a buckle to which the tongue plate is secured; and
a buckle switch that detects whether the tongue plate is not secured to the buckle,
wherein the control unit is configured to rotate the motor in the winding direction when the door open/close detection unit detects an open state of the door and the buckle switch detects that the tongue plate is not secured to the buckle.

7. The occupant protection system according to claim 1, wherein the control unit is configured to stop rotation of the motor when the motor is rotating in the winding direction and the belt position changing member is in the rear position.

* * * * *